(12) United States Patent
Hereford et al.

(10) Patent No.: US 10,140,345 B1
(45) Date of Patent: Nov. 27, 2018

(54) SYSTEM, METHOD, AND COMPUTER PROGRAM FOR IDENTIFYING SIGNIFICANT RECORDS

(71) Applicant: Amdocs Development Limited, Limassol (CY)

(72) Inventors: John Thomas Hereford, Dallas, TX (US); Peter John Cogan, Dublin (IE); Paul Andrew Ferguson, Dublin (IE); Tomasz Rutowski, Gdansk (PL); Catherine Boothman, Dublin (IE)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 361 days.

(21) Appl. No.: 15/060,517

(22) Filed: Mar. 3, 2016

(51) Int. Cl.
*G06F 17/30* (2006.01)

(52) U.S. Cl.
CPC .. *G06F 17/30554* (2013.01); *G06F 17/30371* (2013.01)

(58) Field of Classification Search
CPC ............... G06F 17/30371; G06F 17/30554
USPC ........................................ 707/769
See application file for complete search history.

(56) References Cited

U.S. PATENT DOCUMENTS

| | | | |
|---|---|---|---|
| 6,014,647 A | 1/2000 | Nizzari et al. | |
| 6,026,398 A * | 2/2000 | Brown | G06F 17/30622 704/1 |
| 6,317,700 B1 * | 11/2001 | Bagne | G06N 5/025 702/181 |
| 6,996,551 B2 | 2/2006 | Hellerstein et al. | |
| 7,672,865 B2 | 3/2010 | Kumar et al. | |
| 7,720,759 B2 | 5/2010 | Fine et al. | |
| 7,730,003 B2 | 6/2010 | Pinto et al. | |
| 7,865,383 B2 | 1/2011 | Tafoya | |
| 7,917,383 B2 | 3/2011 | Maga et al. | |
| 8,103,531 B2 | 1/2012 | Wollan et al. | |
| 8,140,362 B2 | 3/2012 | Deshpande et al. | |
| 8,204,884 B2 | 6/2012 | Freedman et al. | |
| 8,311,863 B1 | 11/2012 | Kemp | |
| 8,335,692 B2 | 12/2012 | Sheth et al. | |

(Continued)

FOREIGN PATENT DOCUMENTS

| | | |
|---|---|---|
| WO | 2011079200 A2 | 6/2011 |
| WO | 2013043672 A1 | 3/2013 |

OTHER PUBLICATIONS

"Mean", Wikipedia, downloaded from en.wikipedia.org/wiki/Mean on May 13, 2018, pp. 1-7.*

(Continued)

*Primary Examiner* — Robert Stevens
(74) *Attorney, Agent, or Firm* — Zilka-Kotab, P.C.

(57) ABSTRACT

A system, method, and computer program product are provided for identifying significant records (e.g. journeys, etc.). In use, a plurality of records including a plurality of events are stored. Further, an indication is received regarding at least one subset of the records. Thereafter, at least a portion of the events of the at least one subset of the records are processed to generate mean information such that the records of the at least one subset may be compared, utilizing the mean information. This may be accomplished while avoiding, at least in part, a covariance calculation, or in such a manner that the comparison is independent of such covariance calculation. A result of the comparison may be displayed.

8 Claims, 7 Drawing Sheets

US 10,140,345 B1

Page 2

(56) References Cited

U.S. PATENT DOCUMENTS

| | | | |
|---|---|---|---|
| 8,504,408 | B2 | 8/2013 | Banthia et al. |
| 8,543,690 | B1 | 9/2013 | Zeitoun et al. |
| 8,560,359 | B2 | 10/2013 | Salle et al. |
| 8,600,804 | B2 | 12/2013 | Ramchandani et al. |
| 8,976,955 | B2 | 3/2015 | Liberman Ben-Ami et al. |
| 9,098,810 | B1 | 8/2015 | Sengupta et al. |
| 9,836,760 | B2 | 12/2017 | Greenzeiger et al. |
| 10,067,990 | B1 | 9/2018 | Boothman et al. |
| 2005/0091156 | A1 | 4/2005 | Hailwood et al. |
| 2006/0282298 | A1* | 12/2006 | Azvine ............... G06F 17/3071 705/28 |
| 2008/0040364 | A1 | 2/2008 | Li |
| 2009/0018996 | A1 | 1/2009 | Hunt et al. |
| 2011/0082712 | A1 | 4/2011 | Eberhardt, III et al. |
| 2011/0137853 | A1 | 6/2011 | Mackay |
| 2011/0179067 | A1 | 7/2011 | Dalvi et al. |
| 2012/0158485 | A1 | 6/2012 | Ogawa |
| 2013/0080362 | A1 | 3/2013 | Chang et al. |
| 2013/0244744 | A1 | 9/2013 | Fonss et al. |
| 2013/0282430 | A1 | 10/2013 | Kannan et al. |
| 2013/0317886 | A1 | 11/2013 | Kiran et al. |
| 2014/0052503 | A1 | 2/2014 | Zaloom |
| 2014/0156681 | A1 | 6/2014 | Lee et al. |
| 2014/0207561 | A1 | 7/2014 | Dandekar et al. |
| 2014/0222538 | A1 | 8/2014 | Merrifield, Jr. et al. |
| 2014/0229164 | A1 | 8/2014 | Martens et al. |
| 2015/0074597 | A1 | 3/2015 | Etuaho |
| 2015/0128263 | A1 | 5/2015 | Raugas et al. |
| 2015/0161508 | A1 | 6/2015 | Martinez et al. |
| 2015/0193699 | A1 | 7/2015 | Kil et al. |
| 2015/0244580 | A1 | 8/2015 | Saavedra |
| 2016/0012280 | A1* | 1/2016 | Ito ..................... G06K 9/00288 382/305 |
| 2017/0024640 | A1 | 1/2017 | Deng et al. |
| 2017/0245106 | A1 | 8/2017 | Connelly et al. |

OTHER PUBLICATIONS

"Covariance", Wikipedia, downloaded from en.wikipedia.org/wiki/Covariance on May 13, 2018, pp. 1-7.*

"IBM Journey Analytics," IBM Commerce, Dec. 2015, pp. 1-4, retrieved from https://www.ibm.com/blogs/commerce/articles/tag/ibm-journey-analytics/.

Rittman, S., "Visualizing the customer journey through analytics," May 1, 2015, pp. 1-2, retrieved http://blogs.sas.com/content/hls/2015/05/01/visualizing-the-customer-journey-through-analytics/.

"Customer Engagement Analytics," NICE Systems, pp. 1-5, retrieved on Jan. 25, 2016 from http://www.nice.com/engage/customer-engagement-analytics.

Rabiner, L. R., "A tutorial on hidden Markov models and selected applications in speech recognition," Proceedings of the IEEE, vol. 77, No. 2, Feb. 1989, pp. 257-286.

Heineman, G. T. et al., "Algorithms in a Nutshell; A Desktop Quick Reference" First Edition, 2009, 344 pages.

Buttle, F., "Customer Relationship Management: Concepts and Technologies," Second Edition, Butterworth-Heinemann, 2009, 523 pages.

Brugnoli, G., "Connecting the Dots of User Experience—The design of an interaction system: a tool to analyze and design the user experience," Journal of Information Architecture, vol. 1, Issue 1, 2009, pp. 6-15.

Richardson, A., "Innovation X: Why a Company's Toughest Problems are it's Greatest Advantage," Jossey-Bass, Wiley, 2010, ebook, pp. 1-264.

Mangiaracina, R. et al., "The eCommerce Customer Journey: A Model to Assess and Compare the User Experience of the eCommerce Websites," Journal of Internet Banking and Commerce, vol. 14, No. 3, Dec. 2009, pp. 1-11.

Lavalle, S. et al., "Big Data, Analytics and the Path From Insights to Value," MIT Sloan Management Review, vol. 52, No. 2, Winter 2011, 13 pages.

Heineman, G. T. et al., "Algorithms in a Nutshell; A Desktop Quick Reference" First Edition, 2009, Chapter 7, 55 pages.

Non-Final Office Action from U.S. Appl. No. 15/060,511, dated Apr. 19, 2018, 20 pages.

Non-Final Office Action from U.S. Appl. No. 15/060,520, dated Mar. 8, 2018, 35 pages.

Hamuro et al., "A Machine Learning Algorithm for Analyzing String Patterns Helps to Discover Simple and Interpretable Business Rules from Purchase History," Progress in Discovery Science 2001, LNAI 2281, 2002, pp. 565-575.

Notice of Allowance from U.S. Appl. No. 15/060,520, dated Jul. 17, 2018, 9 pages.

* cited by examiner

SYSTEM, METHOD, AND COMPUTER PROGRAM FOR IDENTIFYING SIGNIFICANT RECORDS

FIELD OF THE INVENTION

The present invention relates to customer data processing systems, and more particularly to processing customer data for analysis purposes.

BACKGROUND

A variety of customer data processing systems exist for tracking information on interactions a customer has with a business. During use, such customer data processing systems process the aforementioned information for a variety of analysis purposes. For example, some systems generate maps reflecting the aforementioned interactions based on various criteria. To date, such customer data processing systems lack an ability to identify significant records (e.g. journeys, etc.) in an efficient manner.

There is thus a need for addressing these and/or other issues associated with the prior art.

SUMMARY

A system, method, and computer program product are provided for identifying significant records (e.g. journeys, etc.). In use, a plurality of records including a plurality of events are stored. Further, an indication is received regarding at least one subset of the records. Thereafter, at least a portion of the events of the at least one subset of the records are processed to generate mean information such that the records of the at least one subset may be compared, utilizing the mean information. This may be accomplished while avoiding, at least in part, a covariance calculation, or in such a manner that the comparison is independent of such covariance calculation. A result of the comparison may be displayed.

DETAILED DESCRIPTION

Figure 1:
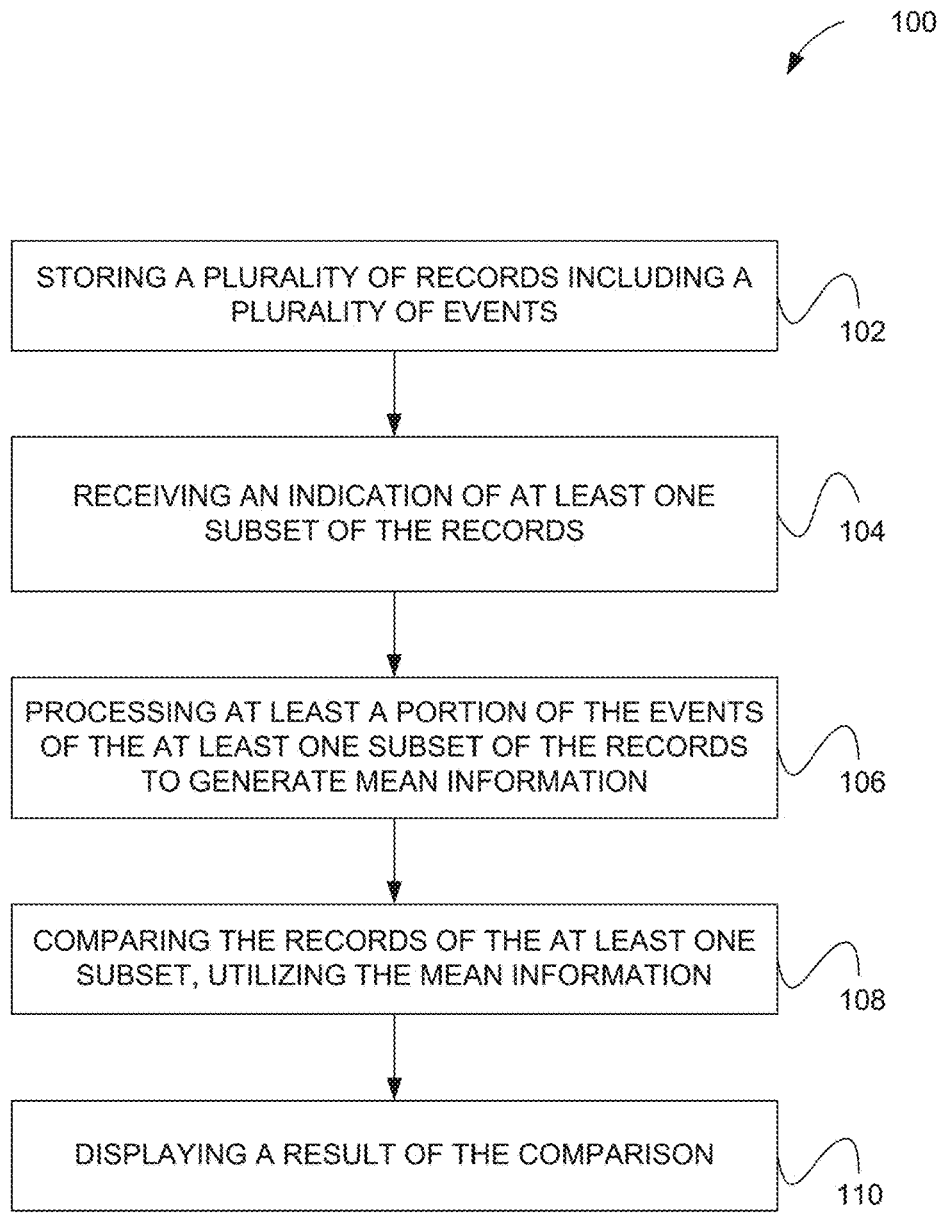
FIG. 1 illustrates a method for identifying significant records (e.g. journeys, etc.), in accordance with one embodiment.

FIG. 1 illustrates a method 100 for identifying significant records (e.g. journeys, etc.), in accordance with one embodiment. As indicated in operation 102, a plurality of records are stored. The records collectively include a plurality of events of different event types. Further, such events relate to a plurality of different customers. As an option, in one possible embodiment, the events may be collected from a plurality of different sources.

In the context of the present description, a record may refer to any one or more data structures that is capable of including one or more events. Also in the context of the present description, an event refers to any information relating to an event involving one or more of the aforementioned customers. Just by way of example, in one exemplary embodiment, each event may involve an off-line and/or on-line interaction with one or more of the aforementioned customers. Still yet, the types of the events may differ in any desired manner. For instance, in one possible embodiment, one or more events may relate to a call or message (or any other communication, for that matter) received from and/or sent to a particular customer, one or more events may relate to a purchase made by a particular customer, one or more events may relate to a return made by a particular customer, etc.

In one optional embodiment to be described in the context of subsequent figures, the aforementioned record may include a "journey record," or more simply just a "journey", of a customer. In the context of the present description, a journey record, or a journey, refers to any sequence of events over time in connection with at least one customer. Still yet, in the context of the optional embodiment where the records include journeys, one or more events thereof may possibly each include a "sub-journey record," or more simply just a "sub-journey."

As indicated in operation 104, an indication is received of at least one subset of the records. In the context of the present description, such indication may include any user input that is capable of being received and resulting in the at least one subset of the records being identified for subsequent processing. Just by way of example, in one embodiment, the indication may specifically identify the at least one subset of records themselves. In other embodiments, the indication may relate to one or more aspects potentially corresponding with the records such that, if the indicated aspect(s) match those of the at least one subset of records, the subset is thereby identified. Of course, other embodiments are contemplated where the indication may involve anything that results in the at least one subset of records being identified for subsequent processing.

Further, at least a portion of the events of the at least one subset of the records is processed to generate mean information, as indicated in operation 106. In the context of the present description, such mean information may include any information that, at least in part, involves an average. To this end, the mean information may or may not include other information unrelated to the average. For instance, the mean information may, in some optional embodiments, incorporate population size.

Still yet, it should be noted that, in some embodiments, the at least portion of the events that are subject to the processing may include all of the events of the records subset, or, in other embodiments, the at least portion of the events may include fewer than all of such events. In the latter embodiment, such portion of the events may be selected in any desired manner. For example, in one embodiment, the at least portion of the events of the at least one subset of records may be identified, by identifying an anchor event, a plurality of pre-anchor events, and/or a plurality of post-anchor events. In the context of the present description, an anchor event may refer to an event around which a decision of significance is to be tested, and the pre-anchor events and post-anchor events are those that precede and follow the anchor event, respectively.

Still yet, in one possible embodiment, the at least one subset of records may be organized in a two-dimensional array to facilitate processing. In other embodiments that will be described later in greater detail, the processing may be iterated, if there is a commonality between the compared records of the at least one subset. Even still, for reasons that we will be set forth later in the context of later-described embodiments, the processing may utilize binary conditions assigned to each record of the at least one records subset. In some of such embodiments, such binary conditions may include success and fail values. Further, in other of such embodiments, the binary conditions include a first value indicating that a particular event is present and a second value indicating that the particular event is not present.

In various embodiments, operation 106 may be accomplished while avoiding, at least in part, a covariance calculation. In other embodiments, such processing may proceed in such a manner that the comparison is independent of such covariance calculation. In still other embodiments, the covariance calculation may even be completely avoided. To this end, in some optional embodiments, the mean information may be generated faster than would otherwise occur if a covariance calculation were performed. In the context of the present description, the aforementioned covariance calculation may include any mathematical determination involving covariance values, variance values (e.g. pooled variance values, etc.), and/or any other values related to covariance.

As indicated in operation 108, the records of the at least one subset may be compared, utilizing the mean information. A result of such comparison may take any desired form that allows for its use for a desired purpose. For example, in one possible embodiment, the result may include an indication of one or more events that causes an associated record to deviate from the at least one subset of the records. Such indication may take any desired form, including, but not limited to an identification of the event itself.

To this end, a result of the comparison may be displayed. See operation 110. In various other embodiments, the result may also be used for adjusting future customer journeys. For instance, in one embodiment, at least one business rule may be changed, based on the result.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As mentioned earlier, a journey of a customer may, in various embodiments, relate to experiences of a customer through a set of interactions with systems (e.g. on-line, off-line, etc.). Such customer journey potentially holds valuable information related to actions that customers take, and different paths that are often taken to accomplish the same goals.

Various embodiments involve an analysis of multiple customer journeys that contain a variety of different interactions that lead to the accomplishment of a similar goal. By way of such analysis, such embodiments are capable of identifying patterns that lead to successful and/or unsuccessful outcomes for the customer. Further, by identifying these patterns, insight may be gained into the optimal paths to achieve a desired goal. Armed with such information, customers may be routed to such optimal paths, or, in cases where this is not possible, problematic areas may be identified and subsequently improved.

In such context, a system and method are provided for identifying the aforementioned problematic customer journeys, as well as identify events (e.g. interactions, etc.) which may be causing the foregoing problems. In one embodiment, such system and method may involve evaluating an aggregate difference in a given journey, across an entire customer population. The result may thus provide quantifiable differences between different journeys, and a measurement of a statistical significance of those differences in terms understandable by analysts and/or business stakeholders.

Before the abovementioned problematic journeys and/or events may be identified, journey records are created for each customer. Such journey creation may, in various embodiments, involves extraction of data relating to a plurality of events (e.g. each of their possible touch points, etc.) associated with the customer. Each of such events may capture an interaction between the customer and a business. More information regarding such creation of journey records will be set forth during reference to the various optional embodiments described during reference to FIGS. 2-5 and may further be found with reference to U.S. application Ser. No.: 15/060,511, filed Mar. 3, 2016, and entitled "EVENT PROCESSING SYSTEM, METHOD, AND COMPUTER PROGRAM," which is incorporated herein by reference for all purposes.

After requisite journey records are created, significant journeys may be identified. in one embodiment, such process may begin by breaking down a dataset into a subset of events occurring before and after an anchor event. As mentioned earlier, in the context of the present description, an anchor event may refer to an event around which a decision of significance is to be tested.

In various embodiments, a target outcome measure may occur in events occurring after the anchor event, in order for any insights to be actionable. It should be noted that the pre-anchor and post-anchor events are processed similarly for the purpose of identifying significance; however, actions may be mirrored between them, as detailed later.

In the context of the present embodiment, the journey (or sub-journey) records may be defined as a set of events $X=[X_1, X_2, \ldots X_n]$, where each $X_i$ has a time value $X_{it}$. The anchor event may be defined as $X_a$ and the time of the anchor may be denoted as $X_{at}$. For the given journey record X, each other event $X_{it}$ may be classified into D1 (pre-anchor) or D2 (post-anchor) events, based on a relation in time of the event to $X_{at}$, as follows: $D1=[X_1, X_2, \ldots X_i]$ | $X_{it}<X_{at}$ and $D2=[X_i+1, X_i+2, \ldots X_n]$ | $X_{it}>=X_{at}$.

When aggregated across samples, the vectors X, D1, and D2 become two (2) dimensional arrays S with dimensionality M and N, where N is the number of events and M is the number of records (e.g. journeys, etc.). It should be noted that N varies with each journey (each value of m); so linear algebra operations cannot necessarily (but may) be applied to such constructs.

In the post-anchor dataset D2, the target outcome measurement may be identified and applied as an external attribute of the sub-journey. For instance, a specific journey may be assigned as a positive or negative outcome across both datasets, pre-anchor dataset D1 and post-anchor dataset D2. That is, the entire journey $X_m$ may be attributed the measurement value $X_{mo}$. Thus $X_{mo}=D1_{mo}=D2_{mo}$ for a given journey m. Some sample-level (or population-level) measures may then be calculated for $X_m$, and similarly for pre-anchor dataset D1 and post-anchor dataset D2. To this end, mean and variance estimations are capable of being calculated for the target measurement value.

For example, in one example, if one wants to measure for the presence of a particular event in post-anchor dataset D2, one would assign $X_{mo}$ as either 1 (if the target event exists in post-anchor dataset D2) or 0 (if the event does not exist in post-anchor dataset D2). Across the population X, the mean and variance may thus be calculated per Equations #1.

$$\hat{\mu} = \frac{1}{n}\sum_{i=1}^{n} X_{io}$$
$$\hat{\sigma} = \sum_{i=1}^{n} (X_{io} - \hat{\mu})^2$$

Equations #1

For calculation purposes when looking at binary variables, this reduces to Equation #2.

$$\hat{\sigma}^2 = \frac{n[\hat{\mu}(1-\hat{\mu})^2 + \hat{\mu}^2(1-\hat{\mu})]}{n-1}$$

Equation #2

Using the above equations, variance becomes dependent only on the mean, and not necessarily on the sum of squares across the population. Thus, an individual square variance need not necessarily be calculated and thereby avoided. This factor may, in some optional embodiments, be advantageous for optimizing the process of testing significance. The foregoing measures of mean and variance may thus become comparison points for significance, which will be described later.

Thereafter, a subset of journeys may be identified, against which significance may be accomplished. For example, a significance may be calculated as to a particular step appearing or not appearing, before the anchor event, on a measured outcome. In one embodiment, many permutations may be derived for each case of interest.

Once a test condition is selected, a new data subset on X may be generated by dividing the cases, where the test condition is positive or negative. In some embodiments, it may be more efficient to calculate such sample statistics across the entire dataset, rather than creating individual permutation data sets. Further, by restricting tests to binary conditions (e.g. success or fail, target event present or not, etc.), the information needed for significance testing may be condensed into only the target size and mean. This may, in turn, allow the generation of these two statistics in bulk across many journey subsets and across a common level of denominator, if the subsets are mutually exclusive. Further, there is not necessarily a need to resort to again processing the original dataset, if the tests involve overlaps between the target conditions. In other words, a single event may exist in both test case A and B, and thus A∪B may be required, which cannot be correctly calculated as A+B, since there is overlap between the two sets.

Thus, the significance test itself follows as a comparison of $\hat{\mu}$ and $\hat{\sigma}^2$ between the two populations A and B, by calculating a modified t-statistic. This may be calculated per Equation #3.

$$t_{AB} = \sqrt{\frac{\sigma_A^2 + \sigma_B^2}{\sqrt{n_B}}}$$

Equation #3

The present t-statistic may thus reflect a diminishment on a weight of the volume (n). In some embodiments, a significant frequency of the populations for any two sample sets may make minute changes in $\hat{\mu}$ appear significant; which may be inappropriate given a magnitude of the difference and the relative populations of the two data sets. This may result in an emphasis of differences in outcome over differences in population, allowing for a more relevant measure of significance when comparing across different modified t-statistics. Conceptually, this translates to being able to filter out events which occur due to an intentional business process which are not actually significant, independent of other factors (i.e. type of product, position of customer in product life-cycle, etc.).

The various embodiments disclosed here may then calculate the foregoing modified t-statistics essentially across all permutations of interest, and then allow for easier ranking and/or comparison between journeys and/or between any of the previously mentioned test conditions. Further, the methodology disclosed herein also holds as a comparison against the entire population (that is, testing significance of A and B where A=X). Thus, visibility is gained into whether any single event causes the journey to significantly diverge from the population. This, in turn, provides easier guidance towards which events to focus on for calculating additional analysis.

A non-limiting example will now be described, in accordance with one possible embodiment. Customer journeys may be found to have a common pattern of events near a start of the customer life cycle. At this time, there may be many events related to initial product attainment, and those may be related to each other strictly due to business process constraints. Specifically, product installation may have several journey events related to it (e.g. ordering the product, scheduling the installation, assigning equipment from inventory, coordinating installation resources, validating installation success, registering the customer's product, etc.), There may be a predictive significance in one event since events flow in a specific order due to business policies and/or physical constraints (e.g. equipment must be made available before it can be installed, etc.). These events may thus show to be significant with regard to customer behavior and predicting future events, particularly the ones which occur next in the policy chain. It should be noted, however, this may be a feedback effect due to correlation with a common customer journey during initial product acquisition. As such, de-emphasizing the predictive factors of those types of events allow non-ubiquitous events of interest to rank higher in significance. For example, a customer calling to change their order may be significant, since it occurs less frequently, but may be more meaningful in predicting aberrations from a common flow.

From a business perspective, the deviation from the common sequence (while less common) may be of greater interest. The foregoing modified t-statistic achieves the goal of filtering out the predictive nature of common patterns imposed by external rules and highlights those deviant from the desired and/or common business pattern(s). While, from a strict mathematical perspective, various embodiments disclosed herein may induce skew and/or bias, ease of computation and the accompanied benefits in a computing environment may override the same. Specifically, when dealing with large datasets (e.g. millions or more, etc.), a reduction to simpler calculations potentially enables the identification of significant journeys in reduced time and with reduced processing power, since the data may be consolidated to only the size of a sample (n) and its mean (µ). Aside from being potentially computationally easier, the significance comparisons remain relevant across many different test sets. That is, the same values can compare sets A and B, as well as B and C, or A and C, without having to necessarily regenerate covariance and/or pooled variance values between the different sets.

Beyond computational improvements, various embodiments are also potentially capable of demonstrating that the presentation of significance yields more desirable results. By introducing bias against the more common patterns, the relevance of expected patterns is reduced while increasing the significance of unexpected and therefore actionable patterns.

While the foregoing exemplary embodiments have been focused on customer interactions, it should be noted that the records, events, etc. may be associated with network cloud service orchestration, self-optimizing network solutions, and/or absolutely any other desired environment. Further, the purpose of such processing may vary per the desires of the user and may include, for example, analysis involving churn prediction, life time value prediction, fraud prediction, next best offer, etc.

Figure 2:
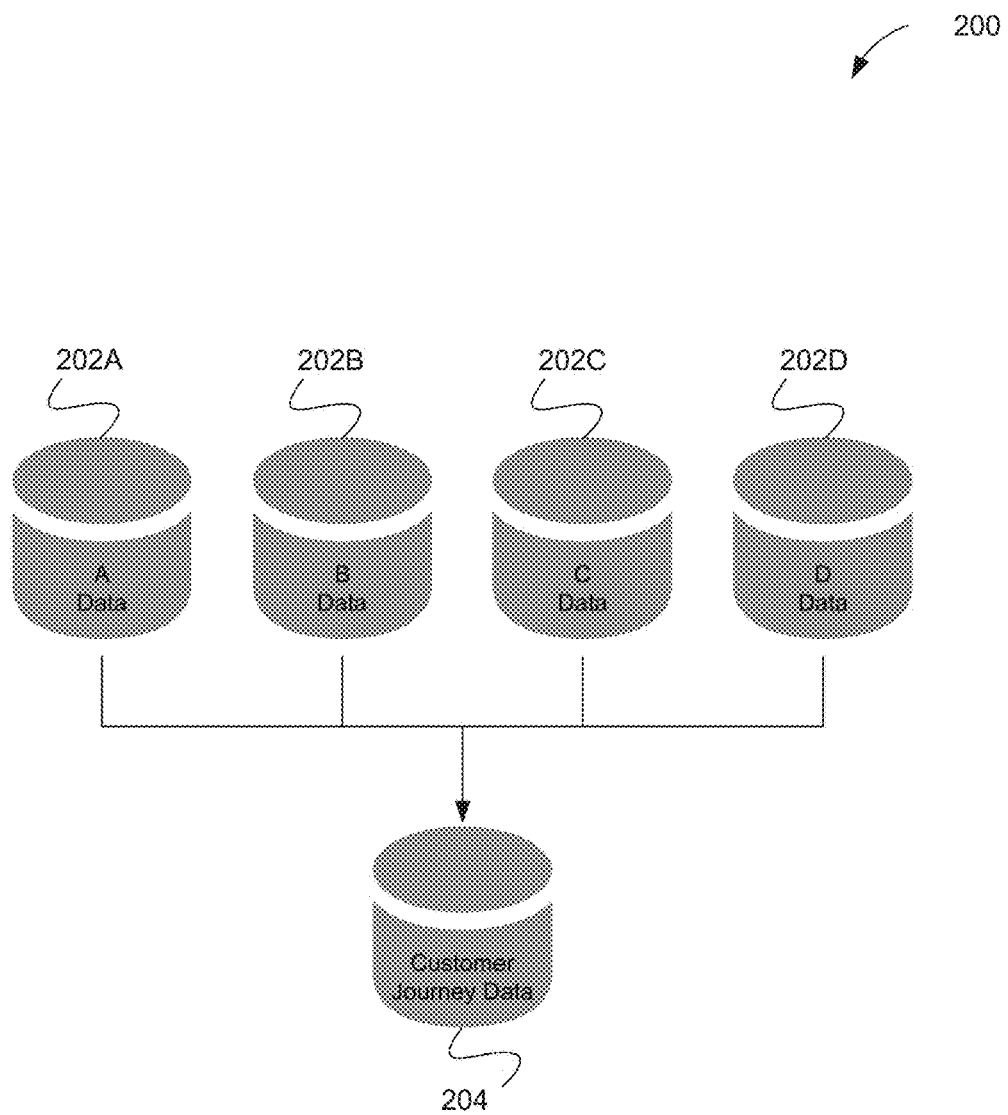
FIG. 2 illustrates a data collection system, in accordance with one embodiment.

More exemplary information will now be set forth regarding the creation of journey records and the events associated therewith, in the context of various optional embodiments. FIG. 2 illustrates a data collection system 200, in accordance with one embodiment. As an option, the system 200 may be implemented in the context of the details of FIG. 1 and/or any subsequent figure(s). Of course, however, the system 200 may be implemented in the context of any desired environment. Further, the aforementioned definitions may equally apply to the description below.

In the context of the present embodiment illustrated in FIG. 2, a "journey" may relate to experiences of a customer through a set of interactions with a business. Such business may include any type of business including, but not limited to a service provider (e.g. network service provider, etc.), a provider of products, etc. As will become apparent, the customer journey may potentially hold valuable information related to different actions and paths that customers take to accomplish various goals.

It should be noted that a full customer journey potentially reflects the customer's interactions across a potentially extended period of time, during which the customer may have many different goals which they were attempting to accomplish. However, if one is interested in analyzing the customer's behavior in relation to accomplishing a specific goal, such larger segments of their full journey (which may be related to one or more different goals) may potentially be unrelated.

To this end, the present embodiment provides for the identification of more relevant sub-journeys. Such targeted sub-journeys may, in turn, provide a view of the actions taken in order to achieve a particular goal. Further, details within each sub-journey may provide the context necessary to understand the actions taken by a particular user to accomplish (or attempt to accomplish) a specific goal.

As will soon become apparent, extracting a large number of the foregoing sub-journeys for different users provides information helpful in differentiating between different user actions and making useful comparisons across users (and/or set(s) of users) in relation to the actions that are taken. In one possible embodiment, this sub-journey creation may be applied in analyzing the behavior of customers in relation to calling a call center. It may further allow for the comparison of factors that lead up to successful outcomes versus those that do not, across multiple users.

In terms of creating a single journey for each customer, data may be extracted relating to each of their events (e.g. touch points, etc.). Each of these events, in the present embodiment, may possibly capture an interaction between the customer and the business. Just by way of example, the events may involve a customer purchasing a product, a customer phoning a call center to resolve an issue, and/or any other interaction, for that matter.

In one embodiment, the different events may be stored across a number of sources (e.g. different database 202A, 202B, 202C, 202D) in a variety of different formats. As shown, data from the different database 202A, 202B, 202C, 202D may, in one embodiment, relate to different event types A, B, C, D. Thus, the creation of a single journey for each customer may initially involve extracting required information in a unified format for each customer into a single chronologically ordered list of events in at least one customer journey database 204.

Figure 3:
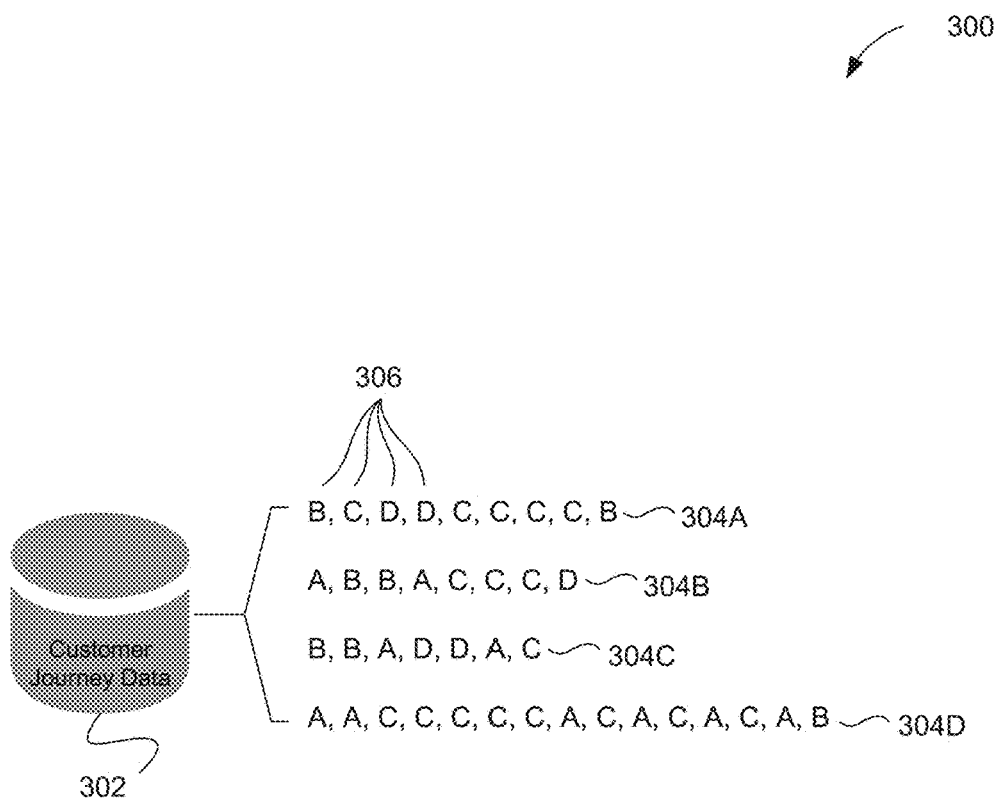
FIG. 3 illustrates a customer journey database system, in accordance with one embodiment.

FIG. 3 illustrates a customer journey database system 300, in accordance with one embodiment. As an option, the system 300 may be implemented in the context of the details of any previous and/or subsequent figure(s). For example, the system 300 may be implemented in the context of the customer journey database 204 of FIG. 2. Of course, however, the system 300 may be implemented in the context of any desired environment. Further, the aforementioned definitions may equally apply to the description below.

As shown in FIG. 3, a customer journey database 302 includes a plurality of journey records 304A, 304B, 304C, 304D each representing a customer journey (in chronological order, in the present embodiment). Further, each of the journey records 304A, 304B, 304C, 304D is illustrated to include a series of events 306 giving details of any interactions the customer had with various systems along the way. While each of the illustrated events 306 (A, B, C, etc.) represents a user interaction in the present embodiment, it should be noted that the information is not limited in this regard. For example, the events 306 may depend on the associated source and there may be potentially numerous different attributes which may be included that provide additional details relating to what precisely occurred during the corresponding event.

Figure 4:
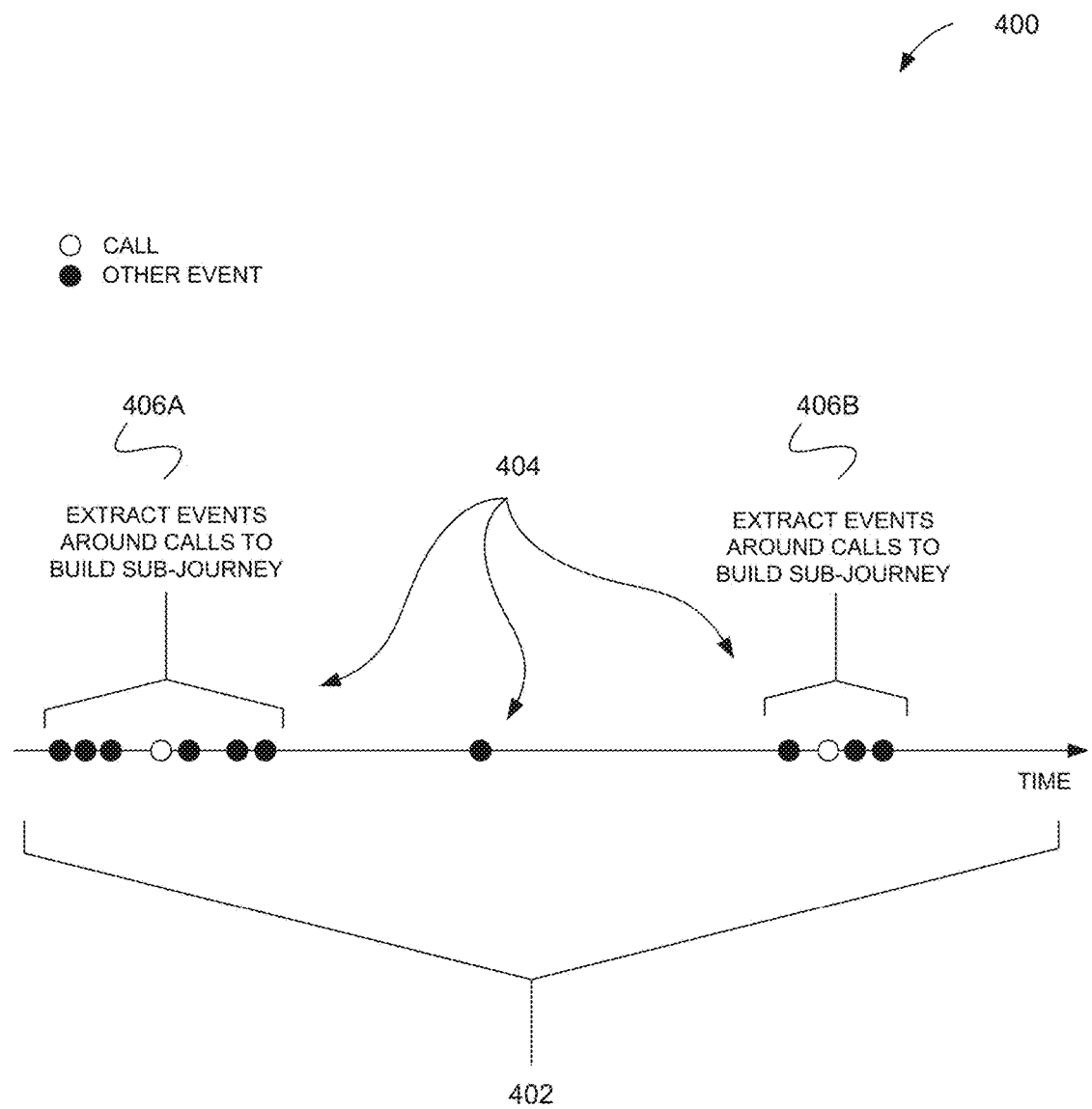
FIG. 4 illustrates a method for creating a targeted sub-journey, in accordance with one embodiment.

FIG. 4 illustrates a method 400 for creating a targeted sub-journey, in accordance with one embodiment. As an option, the method 400 may be implemented in the context of the details of any previous and/or subsequent figure(s). Of course, however, the method 400 may be implemented in the context of any desired environment. Further, the aforementioned definitions may equally apply to the description below.

As shown, a customer journey 402 is illustrated that includes an entire set of events 404 in which a user has been involved, across a potentially very long period of time, during which the customer may have had many different goals which they were attempting to accomplish. The method 400 serves to divide each entire journey 402 into sub-journeys 406A, 406B for creating "aspect"-centric sub-journeys, which provide a view of the actions relevant to the particular aspect. In the present embodiment, the aforementioned aspect may be a particular event (e.g. customer call, etc.) and/or a goal that the customer was attempting to accomplish.

For example, if a customer calls a call center and then calls again in one years' time, it cannot be assumed that the two calls are linked and, in fact, to get a better measure for the customer's experience in interacting with the call center, it may be potentially advantageous (in some embodiments) to look at each call in isolation. For example, isolating the relevant sub-journey 406A, 406B may allow one to look at the context for the call and then examine the customer experience afterwards to see if the issue was resolved. In this example, the user's goal may be to resolve an issue and the event-centric sub-journey that is created may be built around the relevant call.

As shown in FIG. 4, two distinct sub-journeys 406A, 406B are shown to be created, each of which captures the event of interest (e.g. the call, etc.), as well as other events that surround such event. By examining these sub-journeys 406A, 406B individually, factors may be more easily determined that lead to the respective call. It may also be possible to investigate if (and how quickly) the issue was resolved.

In one possible embodiment, the creation of the sub-journeys 406A, 406B may firstly require that an event of interest be specified (e.g. a phone call, etc.). It is also possible that an event of interest may be a sequence of events, or an event where something specific occurred. For instance, such specific occurrence may involve a customer having made a call but their call being transferred, etc. Once this event of interest is defined, a set of other "relevant" events may be extracted. In this sense, the sub-journey may be "targeted" towards the particular event. Depending on the event of interest, relevant events may occur before and/or after such event of interest.

In another possible embodiment, both this, as well as the manner in which relevant events are determined, may be configured. For instance, this may be accomplished based on time. Specifically, the method 400 may only include events for N number of days before and/or after a call, This potentially provides a set of sub-journeys related to a particular event of interest (or sequence of events), including the contextual events that occurred around such event. Each of the sub-journeys 406A, 406B may also be enriched with information relating to a customer profile. For example, various information (e.g. age, demographics, location, etc.) may be provided which may, in turn, account for certain behaviors.

To this end, various embodiments are operable to (but may not necessarily) provide a much more concise set of user interactions that can be used to determine how each customer acts around a particular point of interest. For instance, if a customer calls a call center, a precise sub journey may be extracted showing the events that lead to such call, including potential issues like an incorrect bill being issued, and/or problems with a device they are using. Any additional events following the call may show an effect that the call had on the customer (e.g. if they had to call again to resolve the same issue, etc.).

Figure 5:
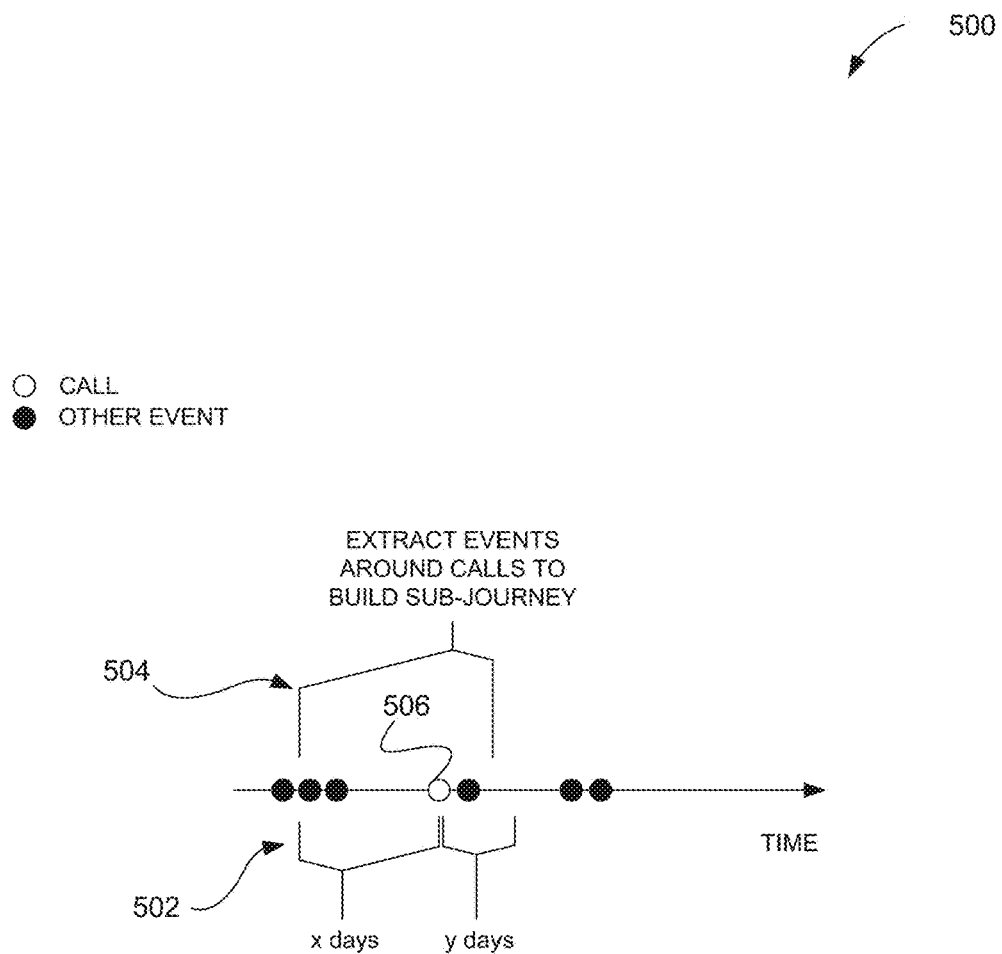
FIG. 5 illustrates a method for creating a targeted sub-journey, in accordance with one embodiment.

FIG. 5 illustrates a method 500 for creating a targeted sub-journey, in accordance with one embodiment. As an option, the method 500 may be implemented in the context of the details of any previous and/or subsequent figure(s). Of course, however, the method 500 may be implemented in the context of any desired environment. Further, the aforementioned definitions may equally apply to the description below.

In various embodiments, relevant events within each sub-journey may be determined in a number of different ways. In one possible embodiment, the specific way may be particular to a type of analysis that is required, based on the extracted sub-journeys. As illustrated in FIG. 5, for instance, certain relevant events 502 within a particular sub-journey 504 may be determined based on their proximity to an event of interest 506. Such proximity may, for instance, be determined as a function of time, or by falling within a specified number of events, etc. In one embodiment, it may also be determined that the relevant events are only of one particular type (and others are possibly not considered).

Alternatively or additionally, a starting point of the targeted sub journey 504 may be signaled by a known event. For example, such known event may involve logging onto a website. By this design, known events may be designed to delimit start and end points of the sub-journey 504. Essentially, such relevance criteria may be determined by a number of factors, based on a need of those carrying out the end analysis, and the relevance criteria may even be specified as a set of rules to be followed in creating the desired sub-journey 504.

To this end, the extracted sub-journey 504 may be used to examine user behavior relating to a particular event and/or action of interest. One possible benefit of such approach of generating the concise sub-journey 504 may be to allow comparisons to be made across a number of customers. By the sub-journey 504 being created in a manner that is related to an event of interest, more meaningful comparisons are enabled across customers. Further, by examining sub-journeys of a large number of customers around the same event of interest, one can potentially gain insight into common factors that lead to success and/or failure.

Additional information will now be set forth, in the context of additional optional embodiments, regarding various techniques for further reducing noise in the targeted sub-journeys. For instance, in one embodiment, a journey/sub-journey database (e.g. see database 204/302 of FIGS. 2/3, etc.) may be utilized to generate two metrics, namely a total number of sub-journeys, and a number of unique sub-journeys. The number of unique sub-journeys may be useful, since customers with a sub-journey in common may have had a similar experience and thus represent a common use case. For example, a database of sub-journeys shown in Table 1 may be considered, where the letters represent events.

TABLE 1

A, B, C
A, D, C
A, B, C
E, F, G,
A, D, C

The database of Table 1 is shown to have a total of five (5) sub-journeys, and three (3) unique sub-journeys. With this, a metric R may be defined to be a ratio of the number of unique sub-journeys to the total number of sub-journeys. See Equation #4.

$$R = \frac{\text{Number of Unique Sub Journeys}}{\text{Number of Sub Journeys}} \quad \text{Equation \#4}$$

where $R$ is in the range $0 < R \leq 1$

In the aforementioned example illustrated in Table 1, R is 0.6. In one embodiment, R may be designed to be as low as possible. For instance, if every sub-journey is unique, then R is 1.

In the end, each unique sub-journey effectively represents a unique business case to be addressed. If there are too many unique sub-journeys, one may have too many business cases, and each business case has a very low number of instances (thus diluting and/or invalidating their value). For example, the set of sub-journeys of Table 2 may be considered, where the underlined events emphasize unique transitions.

TABLE 2

Journey 1 - A, X, B, C, D, E, F
Journey 2 - A, B, Y, C, D, X, E, F
Journey 3 - A, B, D, B, C, D, E, F
Journey 4 - A, B, Z, C, D, Y, E, F
Journey 5 - A, B, C, D, L, E, F In this case, the ratio R is 1 as all sub-journeys are unique. In such case, it may be desired to reduce a noisiness associated with the sub-journeys, by, for example, removing rare event transitions. As exemplified in Table 2, it is quite likely that certain sub-journeys may have very unique sequences inside the sub-journey. This means that there may be existing commonalities at the beginning and/or the end of a sub-journey, but somewhere in the middle, there may be an event that creates an unnecessary unique sub-journey. A technique will now be described which may be used, in some embodiments, in order to identify such events.

In one embodiment, the aforementioned technique may involve the creation of a transition matrix which counts of a number of times a particular event j follows another event i. Thereafter, such counts in the transition matrix may be converted into probabilities. In one embodiment, this may be accomplished by dividing each cell by the sum of all transitions. Still yet, this may be iterated over each sub-journey. To this end, if the event transition in the sub-journey has a probability in the matrix below some threshold T1, such event (e.g. the second event in the transition, etc.) may be deleted.

An example of the foregoing technique will now be described in the context of a journey database illustrated by Table 3.

TABLE 3

Figure 6:
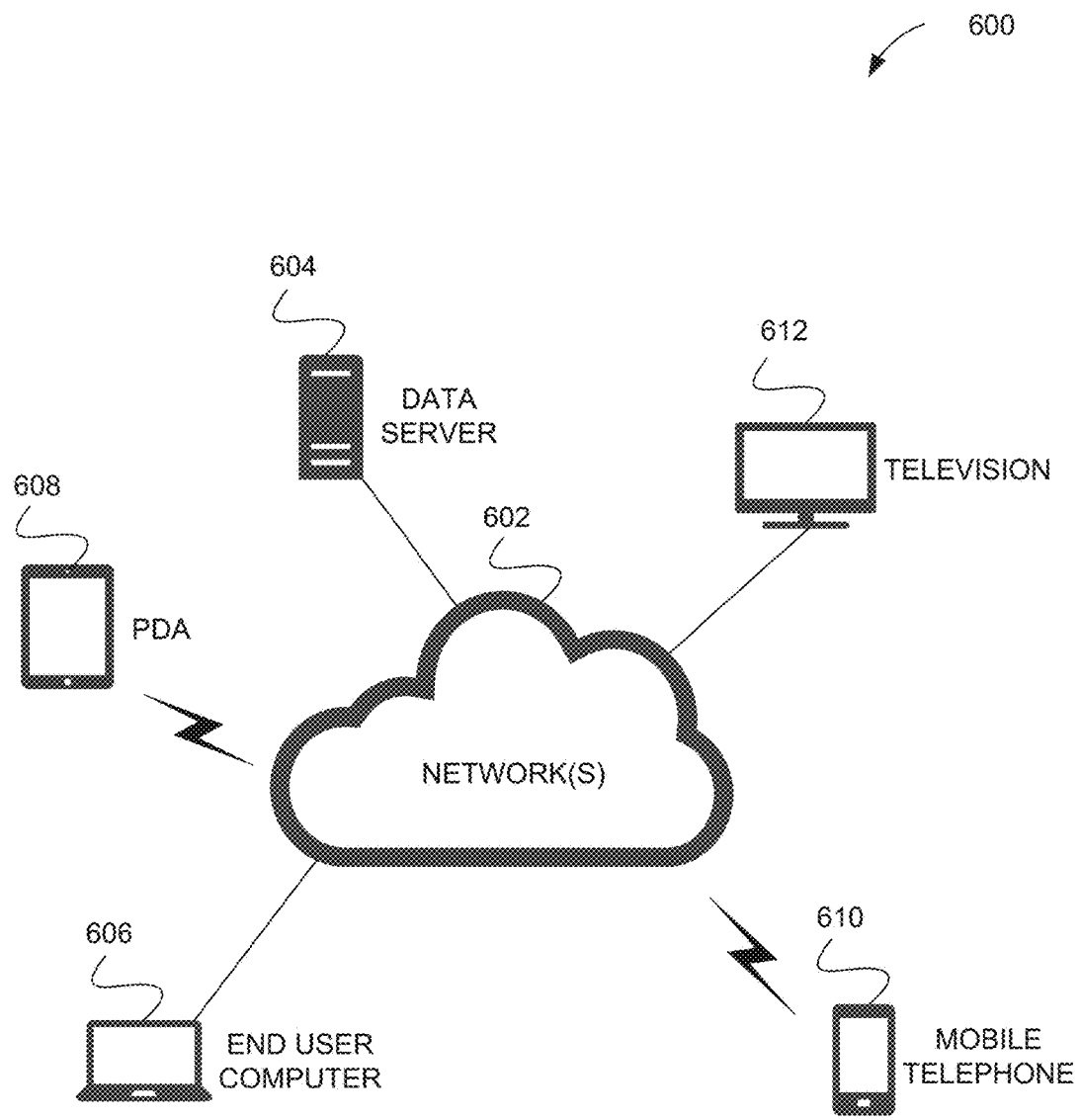
FIG. 6 illustrates a network architecture, in accordance with one possible embodiment.

Journey 1 - A, B, C, D, E, F
Journey 2 - A, B, C, D, X, E, F
Journey 3 - A, B, C, D, E, F
Journey 4 - A, B, C, D, Y, E, F
Journey 5 - A, B, C, D, E, F FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
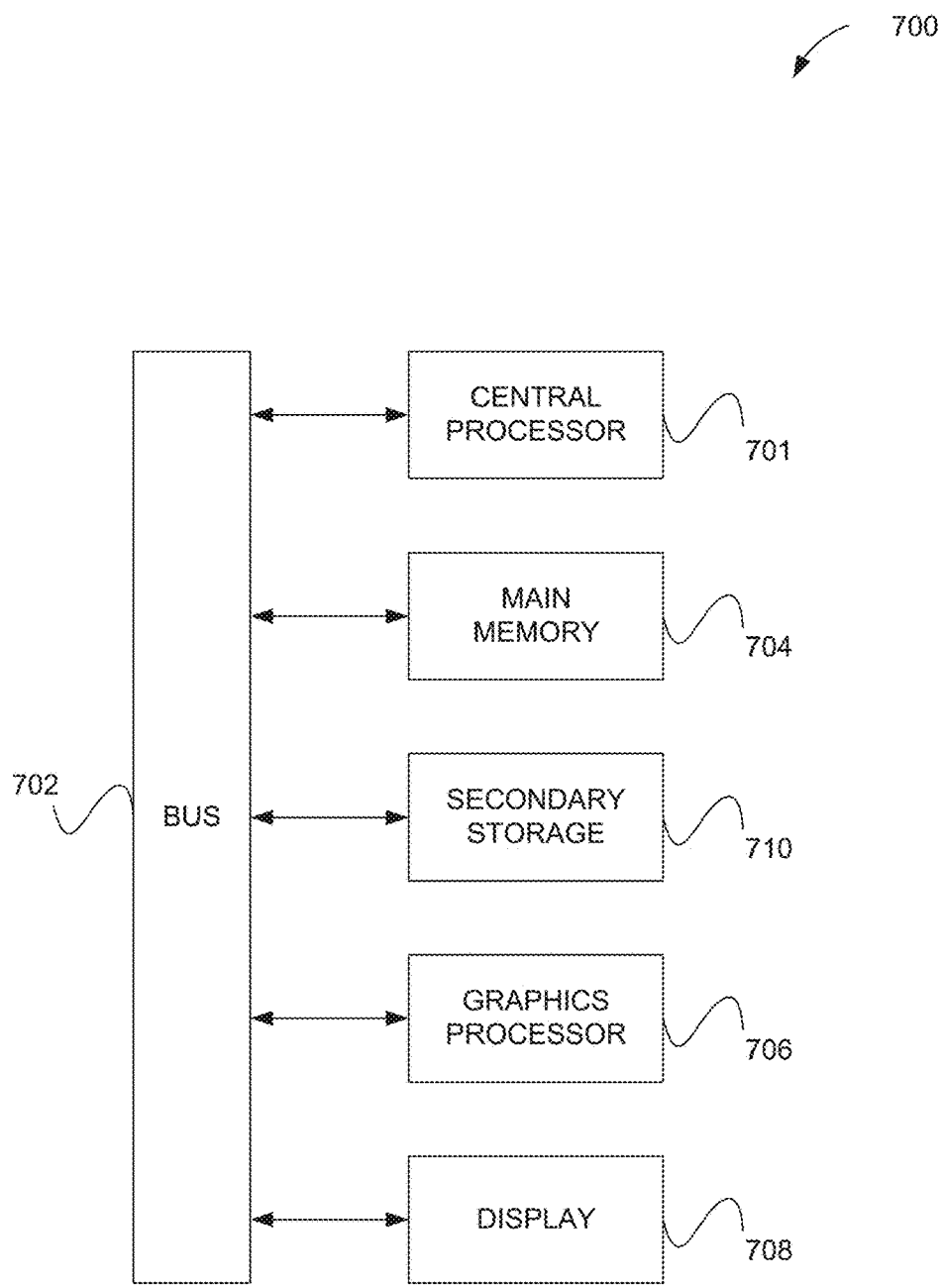
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context,

What is claimed is:

1. A computer program product embodied on a non-transitory computer readable medium, comprising computer code for:

storing, in a database, a plurality of records for a plurality of customers, each record of the plurality of records storing an event sequence associated with customer interactions that includes a plurality of events of different event types;

receiving, via an input device, an indication of one or more aspects associated with one or more of the records;

identifying, based on the indication, a subset of the records having the one or more aspects, the subset including at least two of the records;

processing, utilizing at least one processor, events included in the subset of the records by:

identifying, for each record in the subset of records, an anchor event included therein, the anchor event being an event for which a decision of significance is to be tested, identifying, for each record in the subset of records, a first subset of events included therein occurring before the anchor event identified for the record and a second subset of events included therein occurring after the anchor event identified for the record, determining a target measurement value from one of the records in the subset of the records, calculating a mean measurement value the records in the subset of the records according to the target measurement value, the mean measurement value calculated using the equation:

$$\hat{\mu} = \frac{1}{n} \sum_{i=1}^{n} X_{io}$$

wherein i is the record identifier of the record,
wherein $X_{io}$ is a measurement value for the record,
calculating a variance measurement value based on the mean measurement value, the variance measurement value calculated using the equation:

$$\hat{\sigma}^2 = \frac{n[\hat{\mu}(1-\hat{\mu})^2 + \hat{\mu}^2(1-\hat{\mu})]}{n-1};$$

comparing, utilizing the at least one processor, the records in the subset of the records, utilizing the mean measurement value and the variance measurement value, to identify a particular event in a particular record of the subset of the records that causes the particular record to deviate from other records in the subset of the records; and displaying, via at least one display, an indication of the particular event of the particular record of the subset of the records that causes the particular record to deviate from other records in the subset of the records.

2. The computer program product of claim 1, wherein the target measurement value is a value of a binary condition, and wherein the measurement value for the record is a value of the binary condition assigned to the record.

3. The computer program product of claim 2, wherein the binary condition includes success and fail values.

4. The computer program product of claim 2, wherein the binary condition includes a first value indicating that a particular event is present and a second value indicating that the particular event is not present.

5. The computer program product of claim 1, further comprising computer code for:
changing at least one business rule, based on the indication of the particular event of the particular record of the subset of the records that causes the particular record to deviate from other records in the subset of the records.

6. The computer program product of claim 1, wherein the comparison including calculating a modified t-statistic using the equation:

$$t_{AB} = \sqrt{\frac{\sigma_A^2 + \sigma_B^2}{\sqrt{n_B}}}.$$

7. A method, comprising:
storing, in a database, a plurality of records for a plurality of customers, each record of the plurality of records storing an event sequence associated with customer interactions that includes a plurality of events of different event types;
receiving, via an input device, an indication of one or more aspects associated with one or more of the records;
identifying, based on the indication, a subset of the records having the one or more aspects, the subset including at least two of the records;
processing, utilizing at least one processor, events included in the subset of the records by:
    identifying, for each record in the subset of records, an anchor event included therein, the anchor event being an event for which a decision of significance is to be tested,
    identifying, for each record in the subset of records, a first subset of events included therein occurring before the anchor event identified for the record and a second subset of events included therein occurring after the anchor event identified for the record,
    determining a target measurement value from one of the records in the subset of the records,
    calculating a mean measurement value the records in the subset of the records according to the target measurement value, the mean measurement value calculated using the equation:

$$\hat{\mu} = \frac{1}{n}\sum_{i=1}^{n} X_{io}$$

wherein i is the record identifier of the record,
wherein $X_{io}$ is a measurement value for the record,
calculating a variance measurement value based on the mean measurement value, the variance measurement value calculated using the equation;

$$\hat{\sigma}^2 = \frac{n[\hat{\mu}(1-\hat{\mu})^2 + \hat{\mu}^2(1-\hat{\mu})]}{n-1};$$

comparing, utilizing the at least one processor, the records in the subset of the records, utilizing the mean measurement value and the variance measurement value, to identify a particular event in a particular record of the subset of the records that causes the particular record to deviate from other records in the subset of the records; and
displaying, via at least one display, an indication of the particular event of the particular record of the subset of the records that causes the particular record to deviate from other records in the subset of the records.

8. A system, comprising:
one or more hardware processors for:
storing, in a database, a plurality of records for a plurality of customers, each record of the plurality of records storing an event sequence associated with customer interactions that includes a plurality of events of different event types;
receiving, via an input device, an indication of one or more aspects associated with one or more of the records;
identifying, based on the indication, a subset of the records having the one or more aspects, the subset including at least two of the records;
processing vents included in the subset of the records by:
    identifying, for each record in the subset of records, an anchor event included therein, the anchor event being an event for which a decision of significance is to be tested,
    identifying, for each record in the subset of records, a first subset of events included therein occurring before the anchor event identified for the record and a second subset of events included therein occurring after the anchor event identified for the record,
    determining a target measurement value from one of the records in the subset of the records,
    calculating a mean measurement value the records in the subset of the records according to the target measurement value, the mean measurement value calculated using the equation:

$$\hat{\mu} = \frac{1}{n}\sum_{i=1}^{n} X_{io}$$

wherein i is the record identifier of the record,
wherein $X_{io}$ is a measurement value for the record,
calculating a variance measurement value based on the mean measurement value, the variance measurement value calculated using the equation:

$$\hat{\sigma}^2 = \frac{n[\hat{\mu}(1-\hat{\mu})^2 + \hat{\mu}^2(1-\hat{\mu})]}{n-1};$$

comparing the records in the subset of the records, utilizing the mean measurement value and the variance measurement value, to identify a particular event in a particular record of the subset of the records that causes the particular record to deviate from other records in the subset of the records; and displaying, via at least one display, an indication of the particular event of the particular record of the subset of the records that causes the particular record to deviate from other records in the subset of the records.

* * * * *